United States Patent [19]

Shinokawa et al.

[11] Patent Number: 4,676,350
[45] Date of Patent: Jun. 30, 1987

[54] CONTROL DEVICE FOR CLUTCH AND TRANSMISSION FOR MOTOR VEHICLES

[75] Inventors: Masahide Shinokawa; Yukio Katoh, both of Tokyo; Noriyasu Furuichi, Saitama; Takeshi Miyazawa, Saitama; Takeo Ogano, Saitama, all of Japan

[73] Assignee: Honda Giken Kogyo Kabushiki Kaisha, Tokyo, Japan

[21] Appl. No.: 703,154

[22] Filed: Feb. 19, 1985

[30] Foreign Application Priority Data

Feb. 17, 1984 [JP] Japan ................... 59-29209
Feb. 17, 1984 [JP] Japan ................... 59-29211

[51] Int. Cl.⁴ ............................................. B60K 41/22
[52] U.S. Cl. ........................... 192/3.62; 74/471 XY; 192/3.54; 192/3.62; 192/109 D
[58] Field of Search ............... 192/3.54, 3.61, 3.62, 192/3.63, 109 D, 3.51; 74/471 XY

[56] References Cited

U.S. PATENT DOCUMENTS

| | | | |
|---|---|---|---|
| 1,197,917 | 9/1916 | Dawson et al. | 192/3.62 |
| 1,294,317 | 2/1919 | Staude et al. | 192/3.62 X |
| 1,772,764 | 8/1930 | Vigliano | 192/3.62 |
| 1,986,214 | 1/1935 | McWade | 192/3.62 X |
| 3,352,392 | 11/1967 | Black et al. | 192/85 R X |
| 4,146,120 | 3/1979 | Stevens | 192/3.63 |
| 4,513,847 | 4/1985 | Hansen | 74/471 XY X |
| 4,610,335 | 9/1986 | Miyazawa et al. | 192/3.54 X |

FOREIGN PATENT DOCUMENTS

894357 10/1953 Fed. Rep. of Germany ..... 192/3.54
12837 1/1983 Japan ............................ 74/471 XY Primary Examiner—Rodney M. Bonck
Attorney, Agent, or Firm—Armstrong, Nikaido, Marmelstein & Kubovcik

[57] ABSTRACT

A control device in a motor vehicle having a clutch and a transmission for controlling operation of the clutch and the transmission, includes a control lever angularly movable in first and second directions perpendicular to each other, a first connector mechanism interconnecting the control lever and the transmission for enabling the transmission to shift gears therein in response to angular movement of the control lever in the first direction, a follower having a portion extending in the first direction, the follower being angularly movable in the second direction, the portion being normally held in contact with the control lever when the control lever is angularly moved in the first and second directions, a second connector mechanism interconnecting the follower and the clutch for enabling the clutch to be engaged and disengaged in response to angular movement of the follower in the second direction, and a member for allowing the control lever to be angularly moved in the first direction only when the control lever is angularly moved to cause the second connector mechanism to disengage the clutch.

4 Claims, 10 Drawing Figures

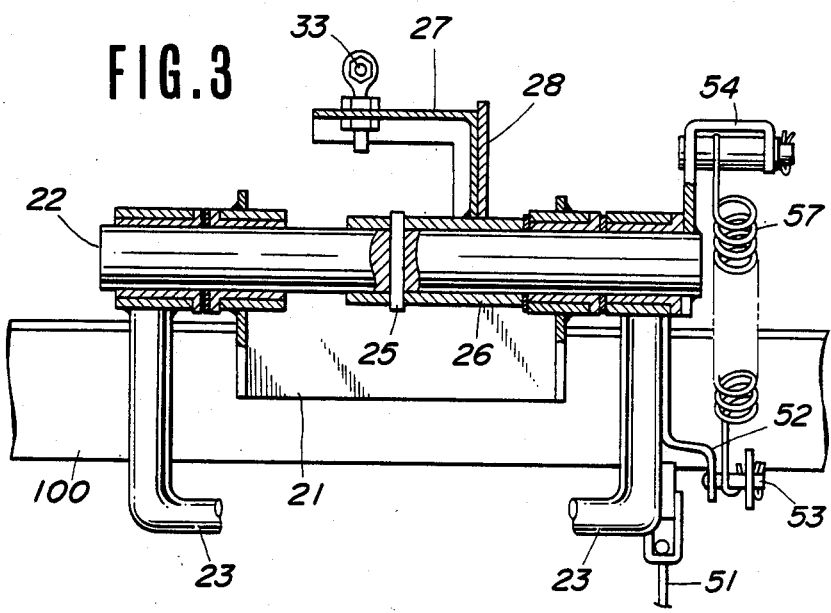
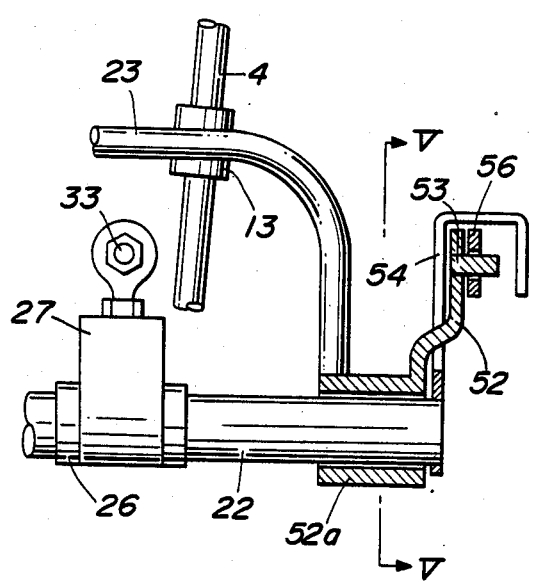

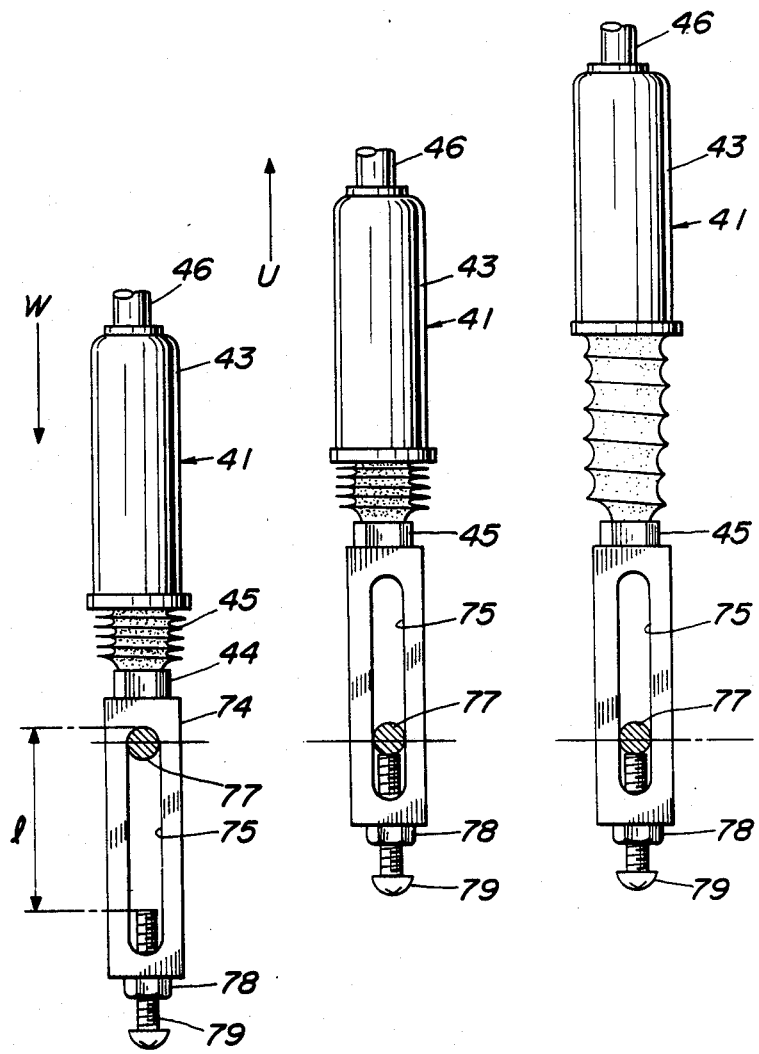

CONTROL DEVICE FOR CLUTCH AND TRANSMISSION FOR MOTOR VEHICLES

BACKGROUND OF THE INVENTION

1. Field of the Invention

The present invention relates to a control device for a clutch and a transmission for a motor vehicle such as a tractor-type working vehicle.

2. Description of the Prior Art

Tractor-mounted working machines having various working units such as lawn mowers, cultivators, snowplows, for example, have a clutch and a transmission for selecting one of a plurality of gear positions to change the speed of travel. The clutch is operated by a clutch control pedal, and the transmission is operated by a transmission control lever. However, it is preferable to use a single control lever for engaging and disengaging the clutch and selecting the gear positions in the transmission in order to facilitate controlling operation by the driver or making a control unit compact.

SUMMARY OF THE INVENTION

It is an object of the present invention to provide a control device of a simple construction for engaging and disengaging a clutch and selecting gear positions in a transmission with a single control lever in a motor vehicle.

Another object of the present invention is to provide a control device for engaging and disengaging a clutch and selecting gear positions in a transmission with a single control lever without allowing mutual interference between the control lever and a pedal for actuating a brake and engaging and disengaging the clutch.

According to the present invention, the above objects can be achieved by a control device in a motor vehicle having a clutch and a transmission for controlling operation of the clutch and the transmission, the control device comprising a control lever angularly movable in first and second directions perpendicular to each other, a first connector mechanism interconnecting the control lever and the transmission for enabling the transmission to shift gears therein in response to angular movement of the control lever in the first direction, a follower having a portion extending in the first direction, the follower being angularly movable in the second direction, the portion being normally held in contact with the control lever when the control lever is angularly moved in the first and second directions, a second connector mechanism interconnecting the follower and the clutch for enabling the clutch to be engaged and disengaged in response to angular movement of the follower in the second direction, and means for allowing the control lever to be angularly moved in the first direction only when the control lever is angularly moved to cause the second connector mechanism to disengage the clutch.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a cross-sectional view of a structure interconnecting a clutch arm and a clutch rod;

FIG. 4 is a fragmentary elevational view, partly in cross section, of the structure of FIG. 3;

FIG. 5 is a cross-sectional view taken along line V—V of FIG. 4;

FIGS. 7(A), 7(B), and 7(C) are side elevational views of a clutch damper, illustrative of the function of a clutch damper control unit.

DESCRIPTION OF THE PREFERRED EMBODIMENT

Figure 1:
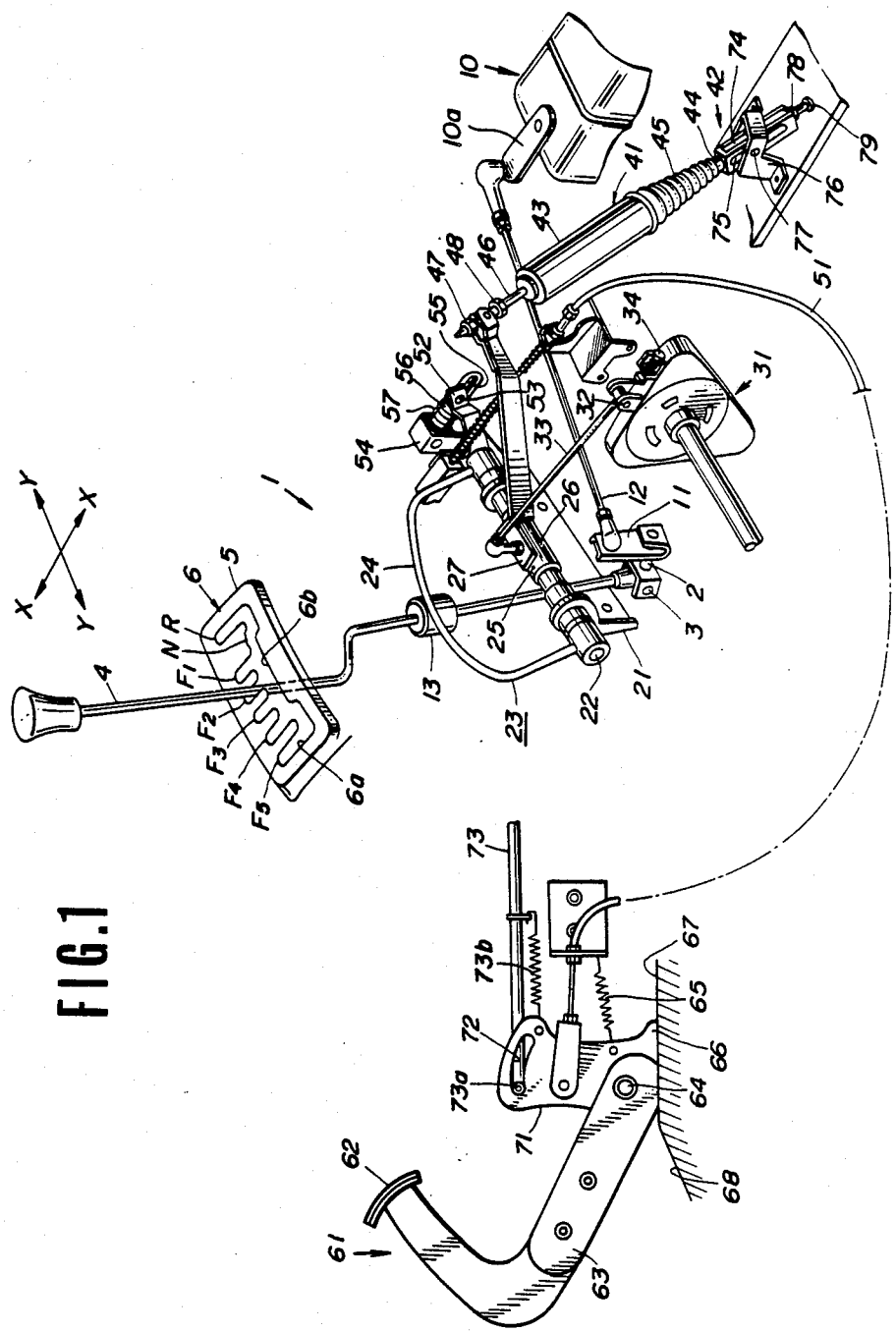
FIG. 1 is a perspective view, partly in side elevation, of a control device according to the present invention operatively coupled to a clutch, a transmission, a control lever, and a brake pedal.
Figure 2:
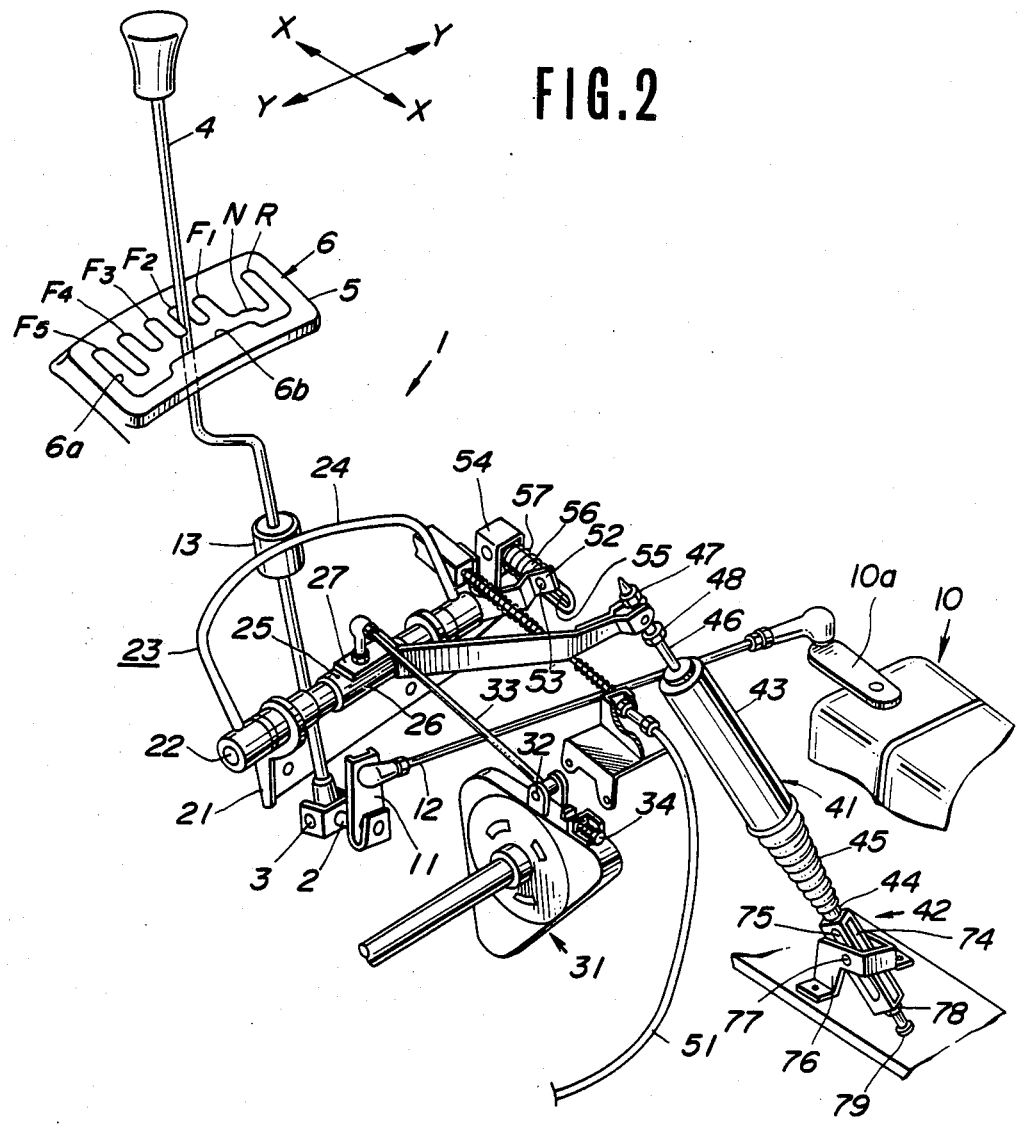
FIG. 2 is an enlarged perspective view of the control device shown in FIG. 1.

As shown in FIGS. 1 and 2, a control device 1 has a control lever 4 angularly movable in two perpendicular directions about two pivot shafts 2, 3. The control lever 4 is guided by a shift pattern 6 in a panel 5.

An arm 11 projects from one of the pivot shafts 2 and is connected to a change rod 12 coupled to a change lever 10a for shifting gears in a transmission 10. The transmission 10 can thus be actuated by angularly moving the control lever 4 about the pivot shaft 2 in the direction of the arrow Y (FIG. 2) along a guide slot 6b defined in the shift pattern 6. The gears in the transmission 10 can be selected by angularly moving the control lever 4 about the pivot shaft 3 in the direction of the arrow X into one of a plurality of engagement slots 6a defined in the shift pattern 6. In the illustrated embodiment, the transmission 10 has five forward gear positions $F_1$, $F_2$, $F_3$, $F_4$, $F_5$, a reverse gear position R, and a neutral position N, which correspond to the engagement slots 6a, respectively.

The engagement slots 6a extending in the direction of the arrow X serve also as guide slots for engaging and disengaging a clutch. When the control lever 4 is in the guide slot 6b extending in the direction of the arrow Y, the clutch is disengaged, and when the control lever 4 is fully placed in one of the engagement slots 6a, the clutch is connected. Therefore, the control lever 4 doubles as a gear shift lever and a clutch lever.

The control lever 4 supports a roller 13 thereon in a position spaced from the pivot shafts 2, 3. A rotatable shaft 22 is supported on a bracket 21 fixed to a vehicle frame 100 (FIG. 3), the rotatable shaft 22 extending over and parallel to the pivot shaft 3. A bow-shaped clutch arm or follower 23 has opposite ends rotatably attached to the shaft 22. The clutch arm 23 includes a control portion 24 extending in the path of gear shifting movement of the control lever 4 for normally contacting the roller 13 when the control lever 4 is angularly moved to shift the gears in the transmission 10. The contact portion 24 is angularly movable in the direction of the arrow X to normally contact the roller 13 in following relation to the control lever 4 as it is moved through each of the engagement slots 6a. The clutch arm 23 is held in contact with the roller 13 on one side thereof, which is closer to the position in which the control lever 4 disengages the clutch.

As shown in FIG. 3, the shaft 22 supports on an intermediate portion a sleeve 26 fixed thereto by a spring pin 25 for rotation therewith. To the sleeve 26, there are fixed a bracket 27 and a damper arm 28. The bracket 27 is connected to a clutch rod 33 coupled to a clutch release lever 32 of a clutch 31. The clutch 31 will be disengaged when the clutch rod 33 is axially pushed toward the clutch 31. The stroke of axial movement of the clutch release lever 32 is limited by a stopper 34 (FIG. 2).

The damper arm 28 is coupled at a distal end thereof to a clutch damper 41 which is a single-acting damper for resisting a tendency to extend the clutch damper 41 axially. The clutch damper 41 is provided at a lower end thereof with a clutch damper control unit 42. The clutch damper 41 has a cylinder 43 accommodating a piston rod 44 having an externally projecting end and a piston integral with the piston rod 44 and slidably disposed in the cylinder 43. A bellows-shaped cover 45 is mounted on the piston rod 44 and the cylinder 43. An attachment shaft 46 is fixed to the other (upper in FIG. 2) end of the cylinder 43 in coaxial relation thereto remotely from the projecting end of the piston rod 44. The attachment shaft 46 is pivotally connected to the distal end of the damper arm 28. The attachment shaft 46 comprises an externally threaded rod connected to the damper arm 28 positionally adjustably by a pair of nuts 47, 48.

The projecting distal end (lower end FIG. 2) of the piston rod 44 is provided with an elongate engagement plate 74 having a guide hole 75 defined therein and extending in the axial direction of the piston rod 44. A support bracket 76 is secured to the vehicle frame and coupled by a fixed pin 77 to the engagement plate 74. The fixed pin 77 is inserted through the guide hole 75 so that the distal end of the piston rod 44 is operatively connected to the engagement plate 74 with looseness in the axial direction of the clutch damper 41. The engagement plate 74, the bracket 76, and the pin 77 jointly constitute the clutch damper control unit 42. A bolt 79 with a lock nut 78 threaded thereover is threaded into the end of the engagement plate 74 remote from the piston rod 44 in coaxial relation thereto, the bolt 79 having an end projecting into the guide hole 75. By turning the bolt 79, the length of the guide hole 75 can be adjusted to vary the magnitude of looseness (indicated by l in FIG. 7(A)) with which the engagement plate 74 is coupled to the support bracket 76.

As clearly shown in FIGS. 3 through 5, a clutch wire 51 coupled to a pedal 61 (FIG. 1) vertically movably mounted on a vehicle floor 67 for engaging and disengaging the clutch 31 and actuating a brake is attached to one of the ends of the arm 23. A support member 52 is fixed by a sleeve 52a to the end of the clutch arm 23 and has a pin 53 on its distal end.

Another support member 54 is secured to one of the ends of the shaft 22. A rod 56 having an oblong hole 55 defined in an end thereof is pivotally coupled to the support member 54. The pin 53 is inserted in the oblong hole 55 in the rod 56. A counter spring 57 in the form of a tension spring is disposed between the pin 53 and the support member 54 for normally urging the support members 52, 54 to be kept assembled at a constant angle and hence for normally urging the clutch arm 23 and the shaft 22 to rotate in unison.

The clutch arm 23 is subjected to the resilient force of a return spring (not shown) for the clutch release lever 32 through the clutch rod 33, the bracket 27, the shaft 22, the support member 54, the counter spring 56, and the support member 52. Therefore, the clutch arm 23 is normally urged in a direction to be held against the roller 13, that is, in a clutch engaging direction.

The pedal 61 includes an arm 63 having a treadle 62 and pivotally attached at an end thereof to a pivot shaft 64. The treadle 62 is normally urged upwardly under the resiliency of a return spring 65. The pedal 61 is vertically movable between an uppermost stroke limit defined by a return stopper 66 and a lowermost stroke limit defined by a stopper 68 on the floor 67.

Another arm 71 projects from the pivoted end of the pedal 61 in a direction different from that in which the arm 63 projects. The arm 71 has an arcuate slot 72 defined in a distal end thereof about the pivot shaft 64. The clutch wire 51 is coupled at one end thereof to an intermediate portion of the arm 71.

A brake rod 73 has a bent end 73a inserted in the arcuate slot 72. The bend end 73a is normally urged to be held against an end of the arcuate slot 72 under the resiliency of a coil spring 73b acting between the brake rod 73 and the arm 71. For braking the vehicle, the pedal 61 is depressed to tension the coil spring 73b and then cause the brake rod end 73a to slide in the slot 72. Since the brake rod 73 is moved after the pedal 62 has started being turned, only a weak braking force is generated when the pedal 62 starts to be depressed. As the pedal 62 approaches its lower stroke limit, the brake rod end 73a engages an opposite end of the slot 72, whereupon the brake rod 73 moves with the turning movement of the pedal 61, thus producing a large braking force.

Figure 6:
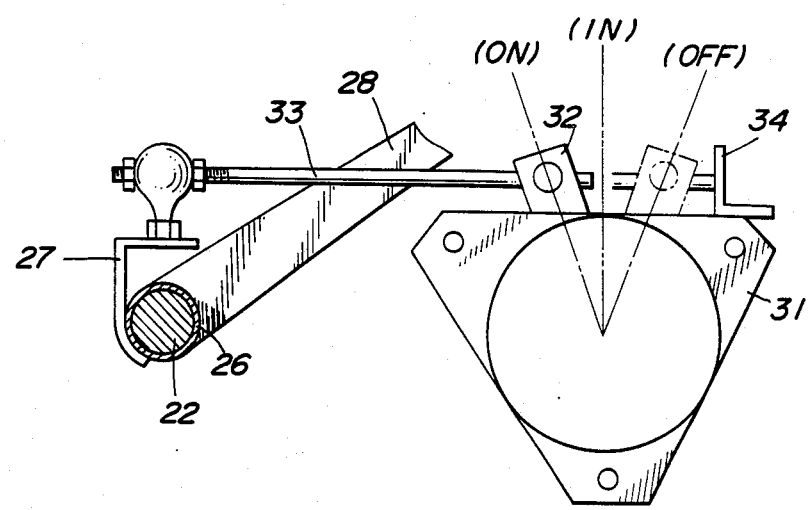
FIG. 6 is an elevational view, partly in cross section, showing the manner in which a clutch is operated.

Operation of the control device according to the present invention will be described. While the control lever 4 is in the guide slot 6b, the clutch arm 23 is tilted by the roller 13 toward the clutch 31. The tilting movement of the clutch arm 23 is transmitted to the bracket 27 through the support member 52, the counter spring 57, the support member 54, the shaft 22, and the sleeve 26, whereupon the clutch rod 33 is pushed to disengage the clutch 31 as indicated by (OFF) in FIG. 6. At this time, an exposed portion of the clutch wire 51 which is attached to the clutch arm 23 is loosened. Therefore, the pedal 61 is not moved upon tilting movement of the control lever 4 from one of the engagement slots 6a into the guide slot 6b. The damper 41 is compressed by the damper arm 28 with the pin 77 positioned at an upper end of the guide hole 75.

When the control lever 4 is angularly moved in the guide slot 6b, the gears in the transmission 10 are shifted through the arm 11 and the change rod 12, while the roller 13 and the arm 23 are held in resilient contact with each other.

When the control lever 4 is tilted from the guide slot 6b into one of the engagement slots 6a, such as the engagement slot 6a for the gear position $F_2$, as shown in FIGS. 1 and 2, the clutch arm 23 is tilted in following relation to the roller 13 under the force of the return spring for the clutch release lever 32. The tilting movement of the arm 23 is transmitted to the bracket 27 through the support member 27, the counter spring 57, the support member 54, the shaft 22, and the sleeve 26. The clutch rod 33 is then pulled to engage the clutch 31 as indicated by (ON) in FIG. 6, and the damper 41 is pulled by the damper arm 28. However, while the pin 77 slides in the guide slot 75, the damper 41 effects no damping on the clutch 31. From the time the pin 77 engages the lower end of the guide slot 75, the damper 41 produces a damping force to engage the clutch 31 slowly.

The looseness of the exposed portion of the clutch wire 51 attached to the arm 23 is now taken up by the tilting movement of the arm 23 into the selected engagement slot 6a. Therefore, the pedal 61 is not moved by the movement of the control lever 4 into the engagement slot 6a.

When the pedal 61 is depressed with the control lever 4 in the selected engagement slot 6a, the arm 23 is angularly moved by the clutch wire 51. The clutch 31 is then disengaged in the same manner as the arm 23 operates while the control lever 4 is positioned in the guide slot 6b as described above. Since the arm 23 is angularly moved in a direction away from the roller 13, the control lever 4 is not moved by the depression of the pedal 61.

When the depressed pedal 61 is released with the control lever 4 in the selected engagement slot 6a, the arm 23 is angularly moved in a direction toward the roller 13. The damper 41 is now actuated in the same manner as the arm 23 operates to bring the control lever from the guide slot 6b into the selected engagement slot 6a as described above, thereby engaging the clutch 31 gradually.

When the control lever 4 is angularly moved from the engagement slot 6a into the guide slot 6b, the arm 23 engaging the control lever 4 through the roller 13 is also angularly moved to cause the shaft 22 to turn therewith since the support member 52 of the arm 23 and the support shaft 54 of the shaft 22 are coupled by the tension spring 57. Since the bracket 27 connected to the clutch rod 33 and the damper arm 28 are fixed to the shaft 22 by the sleeve 26, the clutch lever 32 is moved through the clutch rod 33 from the position "ON" to the position "IN" in FIG. 6 to start disengaging the clutch 31. At this time, the damper 41 is lowered by the damper arm 28 for the length of the guide slot 75. The damper 41 is contracted quickly since there is no appreciable resistance to the contracting movement thereof.

After the clutch release lever 32 moves past the position "IN" and the clutch 31 is disengaged, the change rod 12 and the change arm 10a inactivates the transmission 10. At this time, the control lever 4 is about to enter the guide slot 6b.

When the control lever 4 enters the guide slot 6b, the clutch release lever 32 hits the stopper 34 in the position "OFF", from which time the tension spring 57 between the support members 54, 52 starts extending. Then, any control load is not imposed on the clutch release lever 32, but is absorbed by the extension of the spring 57.

The shaft 22 is no longer turned about its own axis, while allowing the arm 23 to be angularly moved on the shaft 22. The control lever 4 is in the guide slot 6b for selecting a new gear position without imposing any load on the clutch release lever 32.

As described above, the shaft 22 and the arm 23 are interconnected by the tension spring 57 serving as a lost-motion mechanism. Therefore, the shaft 22 and the arm 23 can be moved in unison under the resiliency of the tension spring 57 until the clutch release lever 32 is limited by the stopper 34, and a subsequent stroke of movement of the control lever 4 is permitted.

The difference between the stroke of the control lever 4 in each of the engagement slots 6a and the stroke of the clutch release lever 32 is taken up by sliding the pin 53 in the oblong hole 55 under the tension of the counter spring 57.

Operation of the clutch damper 41 and the clutch damper control unit 42 will be described with reference to FIGS. 7(A), 7(B), and 7(C).

FIG. 7(A) shows the position in which the control lever 4 is positioned in the guide slot 6b and the clutch 31 is completely disengaged. The attachment shaft 46 is pushed in the direction of the arrow W by the displacement of the damper arm 28, with the clutch damper 41 completely contracted. Accordingly, the fixed pin 77 is held against the end of the guide slot 75 closer to the piston rod 44.

When the control lever 4 is moved into a desired one of the engagement slots 6a, the damper 41 is pulled in the direction of the arrow U (FIG. 7(B)) for an interval equal to the looseness l in response to the displacement of the damper arm 28. The fixed pin 77 is relatively moved in the guide hole 75 until it engages the tip end of the bolt 79. The interval of movement of the fixed pin 77, or the magnitude of looseness l is selected through adjustment of the bolt 79 to move the clutch damper 41 from the clutch-disengaging position of the control lever 4 to a position substantially immediately prior to the condition in which the clutch 31 is partly engaged.

Since the control lever 4 is urged in a direction into the engagement slot 6a, the clutch damper 41 is still pulled in the direction of the arrow U after it has displaced over the interval of looseness l. The clutch 31 is gradually connected while being dampened until it is completely engaged. FIG. 7(C) shows the position of the clutch damper 41 in which the clutch 31 is completely engaged.

The clutch 31 can therefore be engaged in a shortest period of time since the clutch 31 is dampened by the clutch damper 41 only in a portion of the entire clutch engaging stroke.

Figure 8:
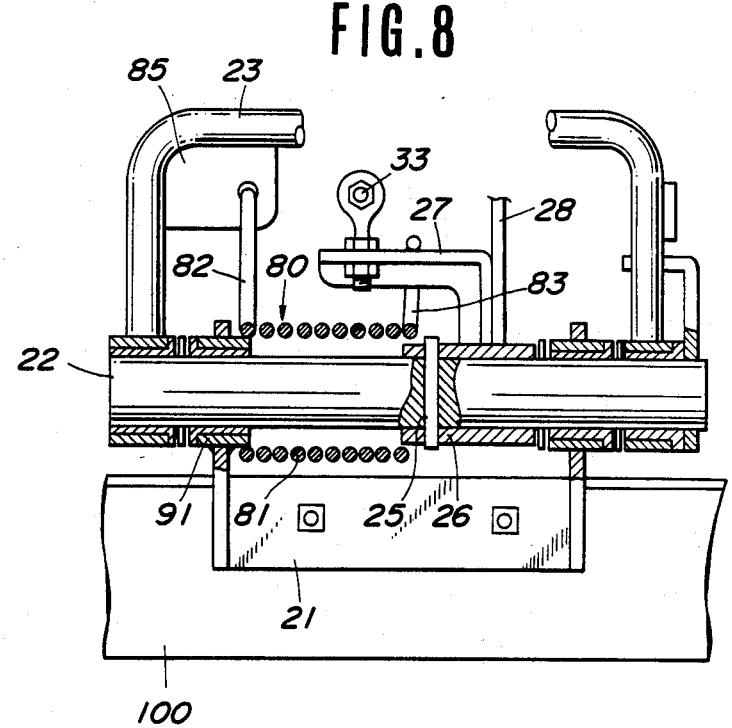
FIG. 8 is a view similar to FIG. 3, showing a modified structure by which a clutch arm and a clutch rod are interconnected.

While in the foregoing embodiment the spring 57 for resiliently keeping the clutch arm 23 and the shaft 22 in an angularly spaced-apart relation is positioned laterally of the arm 23 and the shaft 22, such a spring may be disposed around the shaft 22 as shown in FIG. 8. Like or corresponding parts in FIG. 8 are denoted by like or corresponding reference characters employed in the preceding embodiment. As shown in FIG. 8, a plate 85 is fixed to the inner side of a corner of the arm 23, and a torsion spring 80 coacts between the plate 85 and the bracket 27 fixed to the sleeve 26 fixedly disposed around the shaft 22.

In the illustrated embodiment of FIG. 8, the torsion spring 80 is composed of a coiled portion 81 disposed around the shaft 22 between the sleeve 26 and one bearing 91 of the bracket 21, an arm 82 engaging the plate 85, and another arm 83 engaging the bracket 27. The clutch arm 23 is positioned closer than the bracket 27 to the control lever 4. The bracket 27 and the arm 23 are kept assembled in an uniformly angularly spaced relation to each other.

With the present invention, as described above, the transmission 10 and the clutch 31 can be actuated in interlinked relation with the single control lever 4. The shift pattern 6 is shaped such that when the control lever 4 is moved for shifting transmission gears, it is at first guided in the clutch disengaging direction. Therefore, the gear shifting of the transmission 10 and the engaging and disengaging of the clutch 31 can easily be performed by the single control lever 4.

The clutch arm or follower 23 extends in the path of movement of the control lever 4 in the direction to shift the transmission gears and is angularly movable in the directions to engage and disengage the clutch 31 while being normally held in contact with the control lever 4. Although the control lever 4 is angularly movable in mutually perpendicular directions, it can be operatively coupled to the clutch 31 simply by the clutch arm 23. The control device is therefore of a simple and compact arrangement.

The contacting portion 24 of the clutch arm 23 is held in contact with the control lever 4 on the side thereof closer to the clutch disengaging position. With this arrangement, the control lever 4 can be operated without moving the pedal 61, and the pedal 61 can be depressed without moving the control lever 4.

With the roller 13 mounted on the control lever 4, as illustrated, the control lever 4 and the clutch arm 23 smoothly contact each other through the roller 13. The single-acting damper 41 coupled to the clutch arm 23 enables the clutch 31 to be engaged slowly regardless of how fast the control lever 4 is operated.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

What is claimed is:

1. A control device in a motor vehicle having a clutch and a transmission for controlling operation of the clutch comprising:
    (a) a control lever angularly movable in first and second directions perpendicular to each other;
    (b) a first connector mechanism interconnecting said control lever and said transmission for enabling said transmission to shift gears therein in response to angular movement of said control lever in said first direction;
    (c) a follower having a portion extending in said first direction, said follower being angularly movable in said second direction, said portion being normally held in contact with said control lever when said control lever is angularly moved in said first and second directions;
    (d) a second connector mechanism interconnecting said follower and said clutch for enabling said clutch to be engaged and disengaged in response to angular movement of said follower in said second direction;
    (e) means for allowing said control lever to be angularly moved in said first direction only when said control lever is angularly moved to cause said second connector mechanism to disengage said clutch;
    (f) said follower comprising a bow-shaped member having opposite ends angularly movable about a shaft parallel to an axis about which said control lever is angularly movable in said second direction, said portion of said follower comprising an intermediate portion of said bow-shaped member; and
    (g) said second connector mechanism comprising an element angularly movable with said shaft, a spring acting between said element and said follower, a release lever of said clutch, and a rod member interconnecting said release lever and said element.

2. A control device according to claim 1, wherein said first connector mechanism comprises a pivot shaft angularly movable about its own axis in said first direction in unison with said control lever, an arm angularly movable with said pivot shaft, a change lever of said transmission, and a link member interconnecting said change lever and said arm.

3. A control device according to claim 1, wherein said second connector mechanism also includes a clutch damper for dampening engagement of said clutch, said clutch damper having an end coupled to said element.

4. A control device according to claim 1, wherein said means comprises a panel through which said control lever extends, said panel having a guide slot extending in said first direction and a plurality of engagement slots extending in said second direction, said guide slot communicating with each of said engagement slots at one end of said engagement slots.

* * * * *